(12) United States Patent
Huy

(10) Patent No.: US 11,596,508 B2
(45) Date of Patent: Mar. 7, 2023

(54) ELECTRIC TOOTHBRUSH AND A BRUSH HEAD FOR THE SAME

(71) Applicant: Church & Dwight Co., Inc., Princeton, NJ (US)

(72) Inventor: Gerhart P. Huy, Hamilton Square, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 370 days.

(21) Appl. No.: 16/809,288

(22) Filed: Mar. 4, 2020

(65) Prior Publication Data

US 2020/0281704 A1 Sep. 10, 2020

Related U.S. Application Data

(60) Provisional application No. 62/815,815, filed on Mar. 8, 2019.

(51) Int. Cl.
*A61C 17/34* (2006.01)
*A61C 17/22* (2006.01)

(52) U.S. Cl.
CPC .......... *A61C 17/349* (2013.01); *A61C 17/221* (2013.01); *A61C 17/222* (2013.01); *A61C 17/225* (2013.01); *A61C 17/3472* (2013.01)

(58) Field of Classification Search
CPC ... A61C 17/349; A61C 17/221; A61C 17/222; A61C 17/3472
See application file for complete search history.

(56) References Cited

U.S. PATENT DOCUMENTS 2,044,863 A 6/1936 Sticht
2,657,321 A 10/1953 Smithson
(Continued)

FOREIGN PATENT DOCUMENTS

CN 1780592 5/2006
CN 102202604 9/2011
(Continued)

OTHER PUBLICATIONS

Chinese Office Action dated Sep. 26, 2022, in corresponding Chinese Application No. 202080019016.0.
(Continued)

*Primary Examiner* — Shay Karls
(74) *Attorney, Agent, or Firm* — Church & Dwight Co., Inc.

(57) ABSTRACT

An electric toothbrush is disclosed herein. The electric toothbrush may include an elongated body portion with opposed first and second ends and a longitudinal axis extending therebetween; a brush head section arrangeable toward the first end and including: a first bristle support member rotatable in a first direction, and a second bristle support member coupled to the first bristle support member and rotatable in a second direction about a centrally defined axis, the second direction being opposite the first direction; and a drive rod coupled to at least the first bristle support member and having an axis oriented so as to extend coincident with, or substantially parallel to, the longitudinal axis of the electric toothbrush, the drive rod being arranged to linearly move along the axis so as to rotate the first bristle support member in the first direction and rotate the second bristle support member in the second direction.

13 Claims, 8 Drawing Sheets

(56) References Cited

U.S. PATENT DOCUMENTS

| | | |
|---|---|---|
| 5,120,225 A | 6/1992 | Amit |
| 5,186,627 A | 2/1993 | Amit |
| 5,226,206 A | 7/1993 | Davidovitz et al. |
| 5,353,460 A | 10/1994 | Bauman |
| 5,359,747 A | 11/1994 | Amakasu |
| 5,383,242 A | 1/1995 | Bigler et al. |
| 5,435,034 A | 7/1995 | Bigler et al. |
| 6,434,773 B1 | 8/2002 | Kuo |
| 6,453,499 B1 | 9/2002 | Leuermann |
| 6,463,615 B1 | 10/2002 | Gruber et al. |
| 6,725,490 B2 | 4/2004 | Blaustein et al. |
| 6,799,346 B2 | 10/2004 | Jeng et al. |
| 6,895,625 B2 | 2/2005 | Lev et al. |
| 7,225,494 B2 | 6/2007 | Chan et al. |
| 7,636,976 B2 | 12/2009 | Banning |
| 7,765,629 B2 | 8/2010 | Kressner |
| 7,861,348 B2 | 1/2011 | Chan |
| 7,992,244 B2 | 8/2011 | Prineppi |
| 8,185,991 B2 | 5/2012 | Kressner |
| 8,281,443 B2 | 10/2012 | Brown et al. |
| 8,590,091 B2 | 11/2013 | Dickie et al. |
| 8,607,394 B1 | 12/2013 | Lian |
| 8,677,542 B1 | 3/2014 | Whillock |
| 8,713,738 B2 | 5/2014 | Gatzemeyer et al. |
| 8,739,344 B2 | 6/2014 | Sorrentino |
| 9,301,821 B2 | 4/2016 | Fattori |
| 2002/0174498 A1 | 11/2002 | Li |
| 2003/0084527 A1 | 5/2003 | Brown et al. |
| 2004/0143917 A1 | 7/2004 | Ek |
| 2005/0102776 A1 | 5/2005 | Mathur |
| 2006/0254007 A1 | 11/2006 | Banning |
| 2010/0330538 A1 | 12/2010 | Salazar et al. |
| 2014/0143962 A1 | 5/2014 | Mok et al. |
| 2016/0199165 A1 | 7/2016 | Nikitczuk |

FOREIGN PATENT DOCUMENTS

| | | |
|---|---|---|
| DE | 10315011 | 5/2004 |
| GB | 1583558 | 1/1981 |
| WO | 2003/020159 | 3/2003 |

OTHER PUBLICATIONS

Extended European Search Report dated Oct. 7, 2022, in corresponding European Application No. 20771102.9.

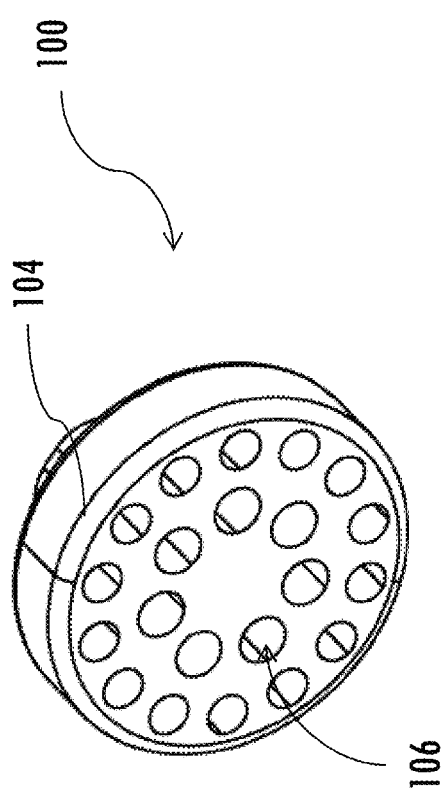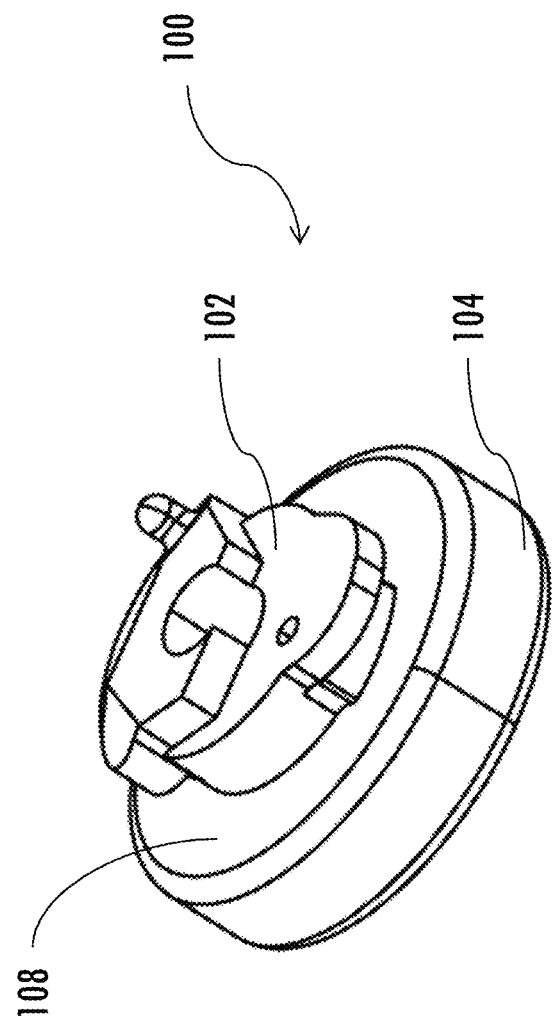
FIG. 4A
FIG. 4B

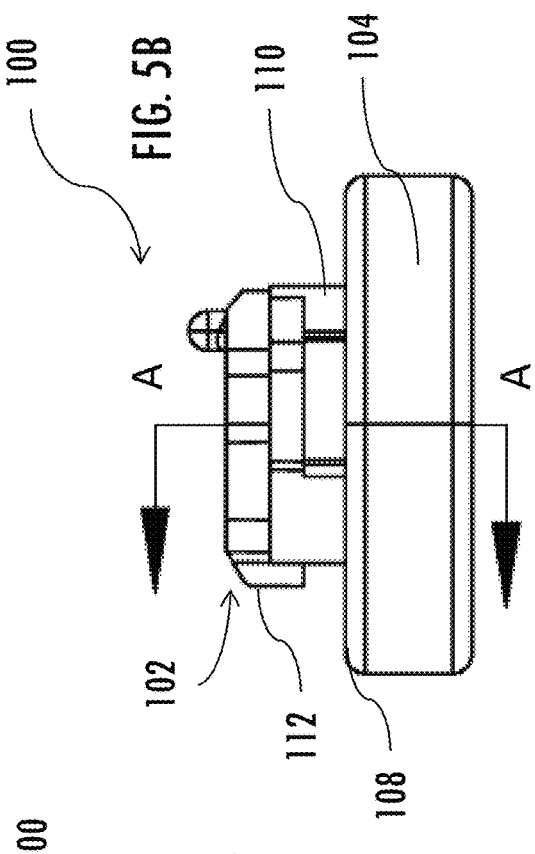
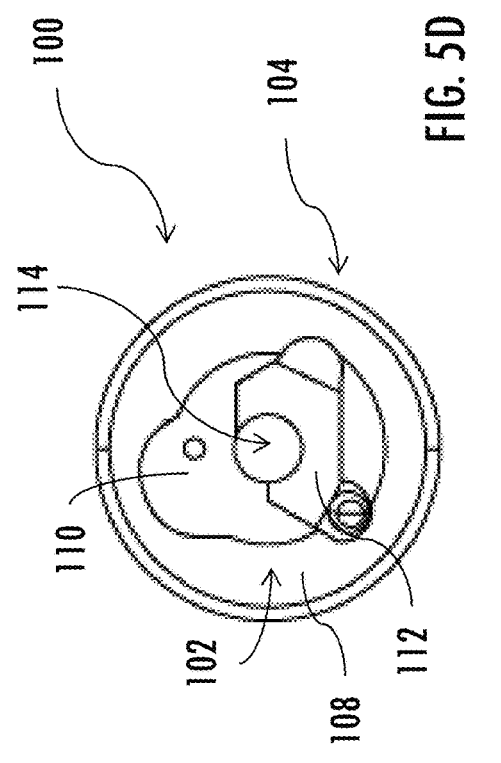
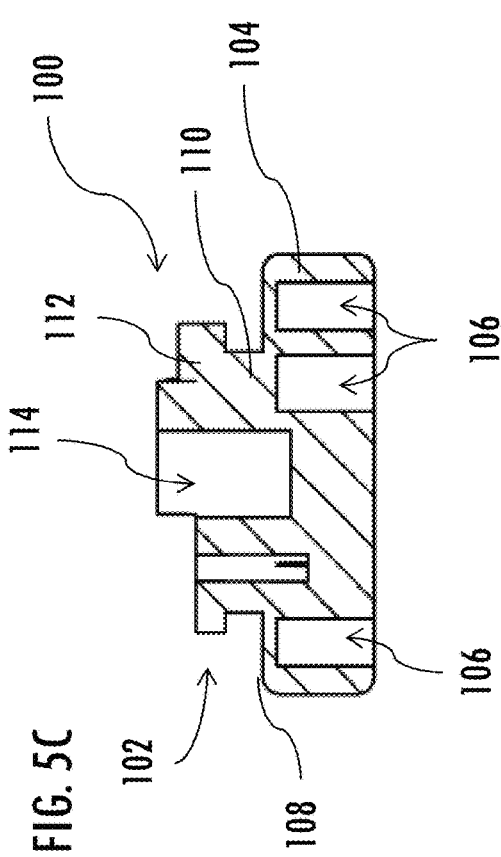

ELECTRIC TOOTHBRUSH AND A BRUSH HEAD FOR THE SAME

CROSS-REFERENCE TO RELATED APPLICATIONS

This application claims priority to U.S. Provisional Application No. 62/815,815, filed Mar. 8, 2019 and entitled, "AN ELECTRIC TOOTHBRUSH AND A BRUSH HEAD FOR THE SAME," this application being incorporated by reference herein.

FIELD OF THE DISCLOSURE

The present invention is an electric toothbrush, and particularly a multi-brush dual action electric toothbrush and a replaceable brush head for the electric toothbrush.

BACKGROUND

The electric toothbrush has appeared in the patent literature since at least as early as the 1930s. See U.S. Pat. No. 2,044,863 to Sticht. A discussion of different types of electric toothbrushes can be found in U.S. Patent Publication No. 2003/0084527 to Brown et al. Early powered toothbrushes were bulky and unnecessarily complex. See U.S. Pat. No. 2,657,321 to Smithson, Jr. Over the years, there has been a steady improvement and evolution of the basic electric toothbrush and parts thereof from the handle through, and including, the brush head, its motion and the bristle arrangement, material, size distribution, material pattern, grouping and rigidity of the brush head bristles. The art also shows toothbrushes specifically designed to address special problems. See U.S. Pat. No. 8,677,542 to Whillock.

It is believed that a dual action electric toothbrush may provide a better cleaning and user experience, and more closely mimic, but improve on, a manual toothbrush motion. Complex motion toothbrushes are known in the art. See U.S. Pat. No. 6,725,490 to Blaustein, U.S. Pat. No. 7,225,494 to Chan et al., and U.S. Pat. No. 8,713,738 to Gatzemeyer et al. Where multiple motion paths are practiced, the drive systems employed in such products have become increasingly complex. See for instance U.S. Pat. No. 8,677,542 to Whillock and U.S. Patent Publication No. 2014/0143962 to Mok et al. These more complicated drive systems have led to increased manufacturing and assembly costs and can contribute to, or in some cases give rise to, durability issues. This is especially true for the multi-head and/or multi-motion type of electric toothbrush.

The thorough and effective cleaning lifespan of the brush or brushing section of any toothbrush, whether hand-powered or electric, is governed by a number of factors and generally can be as short as about three months. The effective cleaning lifespan is a function not only of the continued effectiveness of the brush bristles but also of the integrity of the bristle support structure and motion or drive system of the device. Worn bristles diminish the cleaning performance and therefore the brush or brushes must be replaced periodically. Likewise, worn support structures and parts of the drive system need to be replaced since they also can impact performance. Worn parts can result in misalignment causing excessive vibrations leading to wobble during brushing and can negatively impact cleaning performance, the effective cleaning lifespan, and the user experience.

Since the wear from use is associated with the brush head section and attendant parts, and the more complex and expensive components are within the handle section, it is desirable to provide for a brush head section which, if necessary, can be replaced repeatedly. The replacement brush head section must be provided as a unit which can be quickly, easily and correctly replaced by the consumer with a minimum of time, effort, and expense. The pricing of a replacement brush head section is also a concern since it must be cost effective; otherwise, a consumer may be discouraged from making the initial electric toothbrush purchase. Thus, it is desirable to provide reliable replacement brush parts at a minimum cost and, where possible, improve the effective cleaning lifespan of the brush head section regardless of the market price point of the product.

An important part of any electric toothbrush is its drive system and return system whereby the motor motion is transmitted and adapted to properly actuate the moving parts, especially, the bristle supporting sections, in the desired motion pattern or patterns to perform the desired cleaning function. Numerous toothbrush designs and drive systems have been proposed to impart various types of motion to one or more bristle supporting sections.

U.S. Pat. No. 5,226,206 to Davidovitz discloses a motorized toothbrush having a brush holder 3 carrying 2 bristle holders 4 mounted for partial rotary movement in opposite directions. The brush holder 3 and the portion of the drive assembly of interest are part of carriage assembly 10. See FIG. 2. The brush holder 3 houses a pair of gears 13 and a fixed U-shaped rack member 14 (FIG. 5) or 114 (FIG. 6) in cavity 3a. Rack 14 has a toothed leg and an untoothed leg. When the carrier assembly 10 is reciprocated, it causes the gears 13 to engage the teeth of fixed rack 14 so that bristle holders 4 are rotated while being reciprocated in slots 15a of cover plate 15. Thus the bristle holders undergo reciprocating translation, as well as clockwise and counterclockwise motion. See col. 3, lines 16 to 39.

U.S. Pat. No. 5,359,747 to Amakasu shows a single head electric toothbrush having a case 1 and an attachment 10. The single brush head simultaneously undergoes axial reciprocal motion and a rotary motion. The axial reciprocal motion results because the entire attachment 10 (FIGS. 1-4) is removably attached to the top end of drive shaft but moves together with the reciprocating drive shaft as a single unit. See column 4, lines 3 to 10. An extending bar is mounted inside the attachment such that the bar can slide in the axial direction. The top end of the bar is bent or offset into an "L" shape and provided with a multi-toothed rack which meshes with a multi-tooth pinion 13. According to the disclosure at col. 3 lines 49 to 63, the extending bar 15, which is connected to fixed shaft 9, remains stationary with respect to case 1. The vertical or longitudinal motion of attachment 10, which moves as one body with drive shaft 8, causes pinion 13 to move and its teeth to engage the rack causing the pinion to rotate. Thus, the rack remains stationary relative to the case, but the pinion is in motion. The rotary motion of the pinion is transmitted to the rotary brush member which reciprocally rotates on the attachment. Due to the motion of the attachment, it appears that the rack must have at least six teeth as illustrated in the figures of that patent document.

U.S. Pat. No. 6,895,625 to Lev et al. is primarily concerned with a single brush toothbrush which enters into an automatic mode when activated by contact of the brush with the user's teeth. The brush head of the device of the '625 patent is replaceable and has a brush head with first and second housings which house a part of the drive system. The drive system includes a reciprocating drive shaft which acts like a slider crank mechanism and is attached to a yoke of a pinion carrier. The pinion carrier partially houses a pinion which engages a bristle head. A portion of the pinion interacts with a multi-tooth rack. The reciprocating motion of the drive shaft moves the pinion along the rack and causes the bristle head to simultaneously translate and rotate as best shown in FIGS. 3 and 4 of that patent.

U.S. Pat. No. 8,185,991 to Kressner is directed to a dual action electric toothbrush having two bristle carriers, each of which has a different type of motion, which are mounted on a brush head carrier. In the transmission system, a rigid metal rectilinear rod drive rocker is driven by an eccentric mechanism so that the two ends of the drive rocker execute a double cone shaped tumbling or circulatory movement in a plane perpendicular to the device's longitudinal axis. The drive rocker directed to bristle carrier 10 is seated in a longitudinal slot-like cutout of the carrier and is positioned in that area of the carrier facing the handle section. The rear bristle carrier is rotated about an axis which is perpendicular to the longitudinal axis of the device. Carrier 13 is pivoted about axis 19 (which is essentially parallel to the above mentioned axis and perpendicular to the longitudinal axis of the toothbrush) so that bristle carrier 13 pivots laterally as shown in FIG. 2.

A dual action electric toothbrush is also shown in U.S. Pat. No. 8,590,091 to Dickie. The toothbrush therein described has a first bristle block, an adjacently disposed second bristle block, and a drive shaft with an offset end which engages a third slot of the base and can rotate through 360° causing the first bristle block to move. Rotation of the drive shaft results in a motion of the first block which in turn results in a different type of motion of the second block. The rotation of the drive shaft does not directly cause motion of the second bristle block, but indirectly causes a side-to-side rocking motion of block 54. See col. 7, lines 12 to 42.

U.S. Pat. No. 8,607,394 to Liao pertains to a manual toothbrush which employs in its transmission system a multi-toothed rack and multi-toothed pinion. FIG. 1 shows a single brush head and FIGS. 2-5 pertain to the embodiment shown in FIG. 1. FIGS. 3-5 show a rack having at an outwardly extending bent distal end thereof a series of 4 or more teeth for engagement with a multi-toothed gear depicted as having 10 or more teeth. The gear is attached to a rotating head on which the bristles are mounted. See FIG. 3. The reciprocating motion of the rack enables the teeth to engage the teeth of the gear resulting in the rotation of the brush head. FIGS. 6-8 show an alternate embodiment wherein a group of fixed bristles is mounted on a top panel. The fixed bristles move linearly by means of a sliding shaft as shown in FIGS. 2-5. Other examples of use of a multi-tooth rack and a multi-toothed pinion gear in manual or electric toothbrushes are shown in U.S. Pat. No. 5,120,225 to Amit, U.S. Pat. No. 5,186,627 to Amit et al., U.S. Pat. No. 5,383,242 to Bigler et al., U.S. Pat. No. 5,435,034 to Bigler et al., and U.S. Pat. No. 6,453,499 to Leuermann.

U.S. Patent Publication No. 2005/0102776 to Mathur shows numerous embodiments of a toothbrush head for a toothbrush having a head, a handle at an opposite end thereof, an angled neck there-between, and a longitudinal axis. That portion of the transmission system in the neck and head areas includes a number of swivel arms and attachment pins. See Paragraph Nos. [0047] to [0049]. As shown in FIG. 1B, a third swivel arm has an offset section attached by a pin to an outer edge of the bristle support structure disk. Movement of the swivel arm induces a partial rotation of the support structure about an axis approximately normal to the longitudinal axis. Another embodiment is shown in FIGS. 5A and 5B and differs from that of FIGS. 1-4E in that they show a swivel arm attached to a rack having a plurality of teeth which communicate with the teeth of the gear so that the gear will rotate and counter-rotate. The gear is attached to a threaded hollow cylinder and coupled to a solid threaded cylinder at an opposite end. The rotation of the gear results not only in the rotational movement of the bristles, but also in their vertical movement. See Paragraph [0056]. Other embodiments shown in the publication use rack and gear arrangements to provide different motion paths.

U.S. Patent Publication No. 2002/0174498 to Li relates to an electric single brush toothbrush having a handle section attached to a section. A motor and gearing results in a first connecting rod having a rotary motion. See Paragraph [0011]. A block head is formed of a blockhead tube and a bristle supporting round head. As shown, a tube houses a transmission head and a second connecting rod. That connecting rod extends from a transmission head and has a crooked shaft at its end. The round head attached to the bristles includes a groove which receives the crooked shaft. As shown in FIG. 5, the groove faces the handle section when the round head is at rest. According to Paragraph [0012], in operation, the gearing will cause the first connecting rod to have rotary motion. Through the transmission head and the longitudinal rack, the second connecting rod is caused to rotate. The crank shafts in the groove causes the round head to rotate/counter-rotate and clean the teeth.

U.S. Pat. No. 8,739,344 to Sorrentino shows an approach to address the problem of wear of parts other than bristles resulting from vibration employing vibration isolating zones in the head and reducing vibrations transmitted to the handle.

U.S. Pat. No. 9,301,821 to Fattori shows a refill head for a powered toothbrush. Accordingly, in light of the art, there still remains a need for an improved electric toothbrush and replaceable brush head for the same that improves upon and addresses at least some of the issues described above.

SUMMARY OF THE DISCLOSURE

The present disclosure relates to an electric toothbrush and a replaceable brush head for the same. In some example implementations, an electric toothbrush may comprise an elongated body portion with opposed first and second ends and a longitudinal axis extending between the first and second ends; a brush head section arrangeable toward the first end of the elongated body portion and comprising: a first bristle support member rotatable in a first direction about a centrally defined axis of the first bristle support member, and a second bristle support member coupled to the first bristle support member and rotatable in a second direction about a centrally defined axis of the second bristle support member, the second direction being opposite the first direction; and a drive rod coupled to at least the first bristle support member and having an axis oriented so as to extend coincident with, or substantially parallel to, the longitudinal axis of the electric toothbrush, the drive rod being arranged to linearly move along the axis so as to rotate the first bristle support member in the first direction and rotate the second bristle support member in the second direction.

The drive rod may be coupled to the first bristle support member by a first linkage bar, the first linkage bar comprising a first end coupled to the drive rod and a second end eccentrically coupled to the first bristle support member so as to form a first fixed connection point, the first fixed connection point of the first linkage bar being spaced apart from the centrally defined axis of the first bristle support member.

The second bristle support member may be coupled to the first bristle support member by a second linkage bar, the second linkage bar comprising a first end coupled to the first fixed connection point and a second end eccentrically coupled to the second bristle support member so as to form a second fixed connection point, the second fixed connection point of the second linkage bar being spaced apart from the centrally defined axis of the second bristle support member.

The second end of the elongated body portion may comprise a handle having a motor contained therein, the handle being engageable with the brush head section.

The motor may be operatively coupled with the drive rod such that actuation of the motor linearly and bi-directionally moves the drive rod along the axis thereof.

A battery may be included within the handle to power the motor.

The brush head section may comprise a front shell and a back shell fittingly engaged with one another to form an interior cavity, the first bristle support member, the second bristle support member, and at least a portion of the drive rod being received within the interior cavity.

The first bristle support member and the second bristle support member may extend through the front shell.

The brush head section may comprise a first bristle support pad having one or more bristle tufts arranged thereon and coupled to the first bristle support member and a second bristle support pad having one or more bristle tufts arranged thereon and coupled to the second bristle support member, the first bristle support pad being rotatable in the first direction and the second bristle support pad being rotatable in the second direction.

In some other example implementations, a brush head for an electric toothbrush having an elongated body portion with opposed first and second ends and a longitudinal axis extending between the first and second ends, the brush head may comprise: a brush head section arrangeable toward the first end of the electric toothbrush and comprising: a first bristle support member rotatable in a first direction about a centrally defined axis of the first bristle support member, and a second bristle support member coupled to the first bristle support member and rotatable in a second direction about a centrally defined axis of the second bristle support member, the second direction being opposite the first direction; and at least a portion of a drive rod coupled to at least the first bristle support member and having an axis oriented so as to extend coincident with, or substantially parallel to, the longitudinal axis of the electric toothbrush, the portion of the drive rod being arranged to linearly move along the axis so as to rotate the first bristle support member in the first direction and rotate the second bristle support member in the second direction.

The portion of the drive rod may be coupled to the first bristle support member by a first linkage bar, the first linkage bar comprising a first end coupled to the drive rod and a second end eccentrically coupled to the first bristle support member so as to form a first fixed connection point, the first fixed connection point of the first linkage bar being spaced apart from the centrally defined axis of the first bristle support member.

The second bristle support member may be coupled to the first bristle support member by a second linkage bar, the second linkage bar comprising a first end coupled to the first fixed connection point and a second end eccentrically coupled to the second bristle support member so as to form a second fixed connection point, the second fixed connection point of the second linkage bar being spaced apart from the centrally defined axis of the second bristle support member.

The brush head section may be engageable with a handle arranged at the second end of the elongated body portion of the electric toothbrush and having a motor contained therein.

At least the portion of the drive rod may be operatively coupled with the motor such that actuation of the motor linearly and bi-directionally moves at least the portion of the drive rod along the axis thereof.

The brush head section may comprise a front shell and a back shell fittingly engaged with one another to form an interior cavity, the first bristle support member, the second bristle support member, and at least the portion of the drive rod being received within the interior cavity.

The first bristle support member and the second bristle support member may extend through the front shell.

The brush head section may comprise a first bristle support pad having one or more bristle tufts arranged thereon and coupled to the first bristle support member and a second bristle support pad having one or more bristle tufts arranged thereon and coupled to the second bristle support member, the first bristle support pad being rotatable in the first direction and the second bristle support pad being rotatable in the second direction.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 4A illustrates a perspective, front view of an oscillation head including an un-tufted bristle support pad and bristle support member according to various example implementations of the present disclosure;

FIG. 4B illustrates a perspective, rear view of the un-tufted bristle support pad and the bristle support member of FIG. 4A;

FIG. 5A illustrates a front elevation view of the un-tufted bristle support pad of FIG. 4A;

FIG. 5B illustrates an inverted end view of the bristle support member and the un-tufted bristle support pad of FIG. 5A;

FIG. 5C illustrates a cross-sectional view of the bristle support member and the un-tufted bristle support pad of FIG. 5B along view line A-A;

FIG. 5D illustrates a rear elevation view of the bristle support member and the un-tufted bristle support pad of FIG. 5A;

DETAILED DESCRIPTION OF THE DISCLOSURE

The present disclosure now will be described more fully hereinafter with reference to specific embodiments and particularly to the various drawings provided herewith. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

The present disclosure is directed to an electric toothbrush and a replaceable brush head for the electric toothbrush. More particularly, the electric toothbrush of the present disclosure may comprise a dual head-dual action electric toothbrush wherein the oscillation heads of the toothbrush undergo the same types of motion, but in an opposite rotational direction, and motion paths to provide an enhanced performance, while reducing vibration and improving cleaning efficiency.

Figure 1:
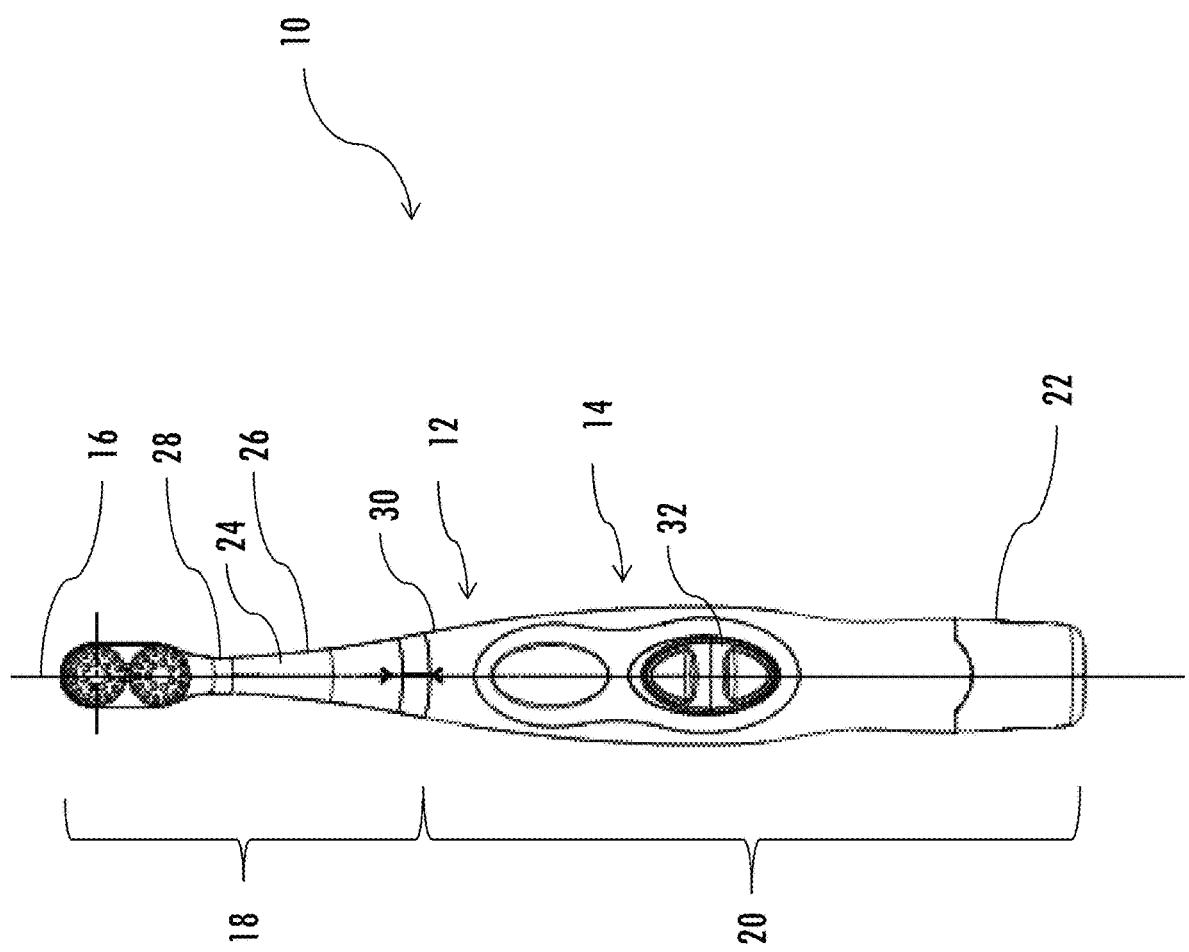
FIG. 1 illustrates a front planar view of an electric toothbrush according to various example implementations of the present disclosure.
Figure 2:
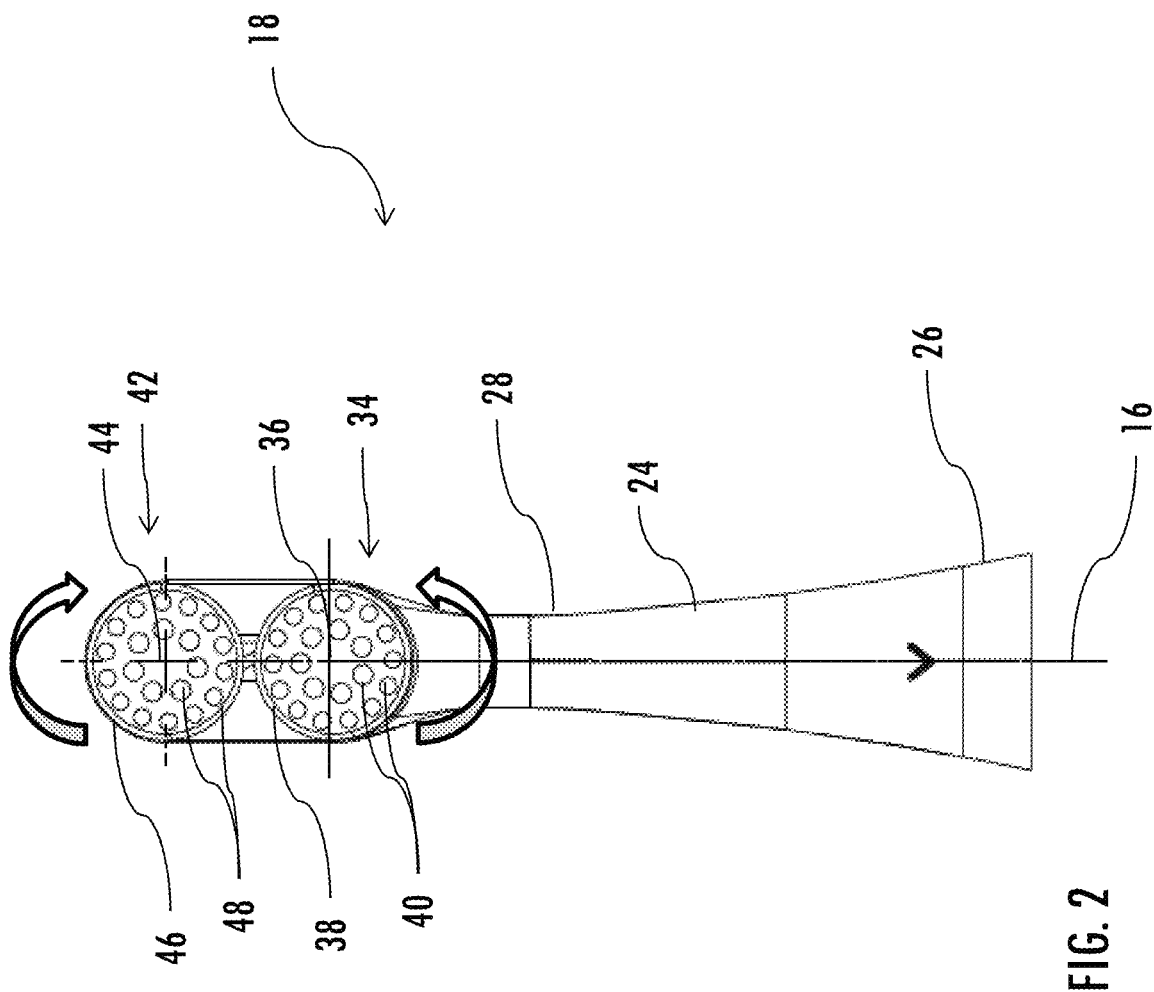
FIG. 2 illustrates an enlarged front planar view of a brush head of FIG. 1.

Referring now to FIG. 1, an electric toothbrush 10 of the present disclosure is shown in a front planar view. The electric toothbrush 10 has an elongated body portion with opposed first and second ends 12, 14 and a longitudinal axis 16 extending between the first and second ends. A brush head comprising a brush head section 18 is arrangeable toward the first end of the elongated body portion, while a handle 20 may be arranged at the second end of the elongated body portion, such that the handle is removeably engageable with the brush head section. Alternatively, the handle and the brush head section are fixedly engaged with one another. Regardless, when engaged with one another, the handle and the brush head section may be at least substantially co-linear along the longitudinal axis as shown in FIG. 1 or may be angularly off-set, as shown in FIGS. 1 and 2 of U.S. Pat. No. 6,360,395 to Blaustein et al., to enable easier access to the back of the mouth.

The handle 20 may have a snap on or hinged snap on cover 22 to allow access to a power source (e.g., a battery) within the handle. More particularly, a compartment may be disposed toward the second end 14 of the electric toothbrush 10 such that when the cover is removed, the battery may be accessed via the compartment. The power source, such as the battery, may be operatively engaged with the motor such that the power source powers the motor.

The brush head section 18 may be formed of a neck section 24 which has a rearward section 26 and a forward section 28. The rearward section may be adapted for a quick and simple coupling to the handle 20 at a forward end 30 thereof such as, for example, by inserting the brush head section into the handle and turning it to snap-lock with the handle. The handle may have an activation/deactivation switch 32 operatively connected to a motor contained within the handle. The handle is preferably of an ergonomic design including depressions and grip areas (not shown) as is known in the art for ease of use and comfort.

As more clearly illustrated in FIG. 2, in one example implementation, the brush head section 18 is a multi-brush head section and comprises two oscillation heads. The first oscillation head comprises a first bristle support member 34 rotatable in a first direction about a centrally defined axis 36 of the first bristle support member. A first bristle support pad 38 having one or more bristle tufts 40 arranged thereon may be coupled to the first bristle support member. The first bristle support pad and the first bristle support member may be integral components or may be separate components fixedly engaged with one another. Thus, the first bristle support pad may also be rotatable in the first direction. In some example implementations, the first bristle support pad has a rounded or circular cross-section, although other cross-section shapes, such as for example, a partial elliptical or ovular cross-section are contemplated.

The brush head section 18 also comprises a second oscillation head including a second bristle support member 42 coupled to the first bristle support member 34 and rotatable in a second direction about a centrally defined axis 44 of the second bristle support member. The second direction that the second bristle support member rotates is opposite the first direction that the first bristle support member operates, such that the first and second bristle support members may be considered counter-spinning heads. A second bristle support pad 46 having one or more bristle tufts 48 arranged thereon may be coupled to the second bristle support member. The second bristle support pad and the second bristle support member may be integral components or may be separate components fixedly engaged with one another. Thus, the second bristle support pad may also be rotatable in the second direction. In some example implementations, the second bristle support pad has a rounded or circular cross-section, although other cross-section shapes, such as for example, a partial elliptical or ovular cross-section are contemplated. As illustrated in FIG. 2, for example, the first bristle support pad and the second bristle support pad have the same shape and size circular cross-sections.

In some example implementations, the arrangement of the bristles to form the bristle tufts 40, 48, bristle hardness, geometry, and/or three dimensional orientation can be varied. For example, the bristles may be positioned in various patterns on their respective pads 38, 46 and grouped or mixed according to hardness, thickness, and/or length. The bristles may be oriented in a vertical configuration normal to the respective pad surface or angularly off-set from the vertical relative to their respective pad.

Figure 3:
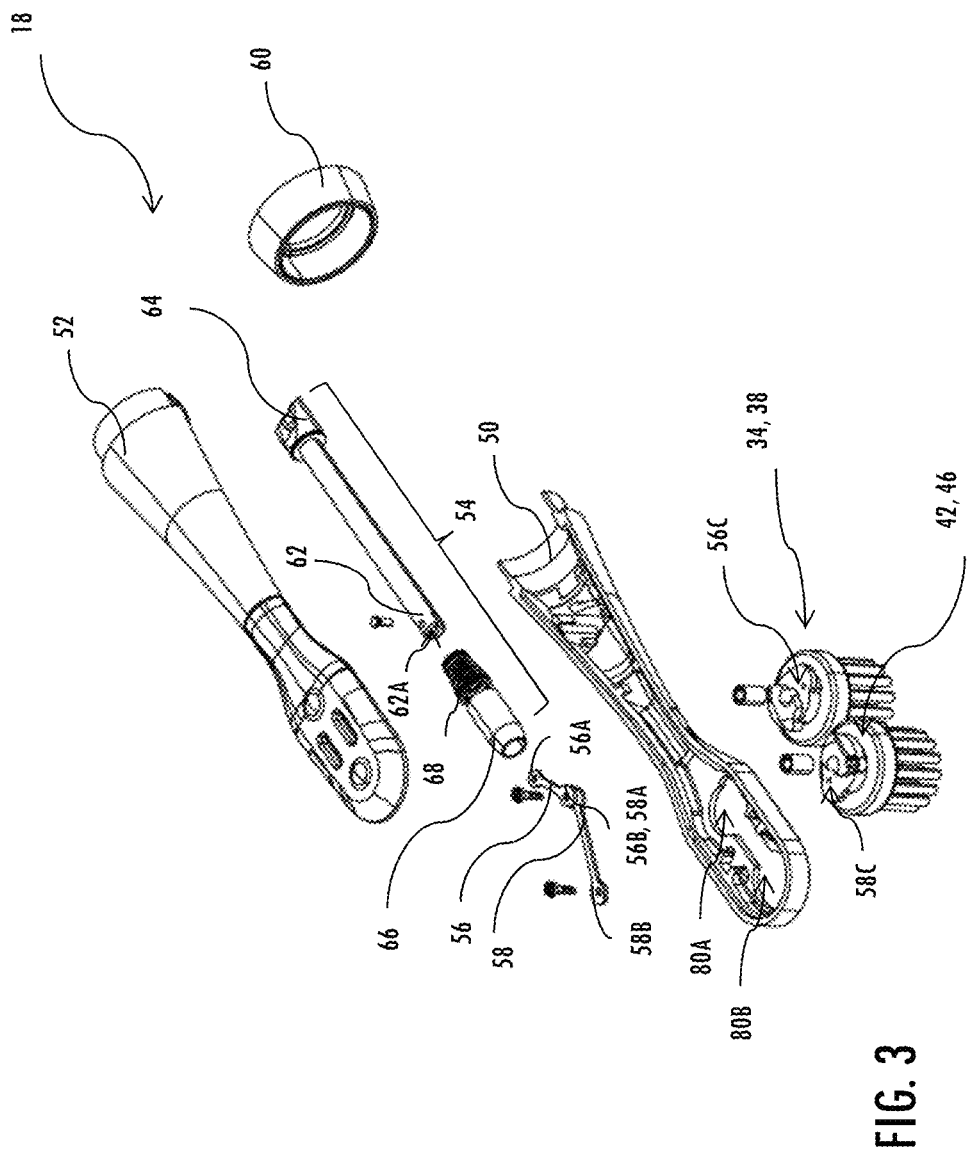
FIG. 3 illustrates an exploded, perspective view of a brush head according to various example implementations of the present disclosure.

FIG. 3 shows an exploded, perspective view of the brush head section 18. The brush head section may be composed of a number of easily assembled component parts. As shown, the brush head section is formed of the first bristle support member 34, the second bristle support member 42, a front shell 50, a back shell 52, a drive rod 54, a first linkage bar 56, a second linkage bar 58, and a coupling member 60 for coupling the brush head section to the handle 20.

Referring now to FIGS. 4A and 4B, various views of an oscillation head 100 including a bristle support member 102 and an un-tufted bristle support pad 104 are illustrated. The oscillation head including the bristle support member and un-tufted bristle support pad illustrated in FIGS. 4A and 4B are generic to both the first oscillation head and the second oscillation head illustrated in FIGS. 1-3.

In FIG. 4A, the un-tufted bristle support pad 104 includes openings 106 for location and attachment of bristle tufts (such as those show in FIG. 3). The tufts/bristles are located and secured in position by conventional means known in the art. The bristle support pad 104 is generally circular in configuration and has an underside 108 at which the bristle support member 102 is disposed, as shown in FIG. 4B. Preferably, the oscillation head 100 is of a one piece (integral) construction and is of a commercially available acetal copolymer.

Referring to FIGS. 5A to 5D, FIG. 5A illustrates a front elevation view of the bristle support pad 104 of the oscillation head 100 of FIG. 4A. FIG. 5B shows an inverted end view of the oscillation head with the bristle support member 102 and the bristle support pad 104 illustrated. The bristle support member includes a mid-section 110 and a bottom member 112. The mid-section of the bristle support member may be in direct contact with the bristle support pad about the underside 108 of the bristle support pad, such that when coupled to one another, the bristle support member and the bristle support pad may be of one piece and of a commercially available acetal copolymer.

As more clearly depicted in FIG. 5C, which is a cross-sectional view along section line A-A of FIG. 5B, the oscillation head 100 defines an opening 114 which extends through the bottom member 112 and the mid-section 110 of the bristle support member 102 and at least partially through the underside 108 of the bristle support pad 104. The opening may be positioned, sized, and configured so as to enable an attachment to the back shell (e.g., the back shell 52 in FIG. 3) as will be described below so that the oscillation head may rotate thereon.

FIG. 5D illustrates a rear elevation view of the bristle support member 102 and the un-tufted bristle support pad 104. As shown in FIG. 5D, the opening 114 may be essentially concentric to the bristle support member 102 and the bristle support pad 102. Where the opening extends through the bristle support member and into the underside 108 of the bristle support pad, it should not impair the structural integrity of the bristle support pad or of the openings 106.

Returning back to FIGS. 2 and 3, in some example implementations, the first bristle support member 34 may be part of, or formed as a part of, a drive rod 54. The drive rod may comprise a multi-zone shaft-like structure. The multi-zones of the drive rod may comprise a lower section 62 which extends below or rearward of the first bristle support member, and an upper section 64. The lower section of the drive rod may form a first connector rod section that is arranged to couple to the first bristle support member 34. In some example implementations a fastening member (such as a screw) may fixedly couple the drive rod at the first connector rod section to the first bristle support member. The upper section of the drive rod may form a second connector rod section that is arranged to couple the drive rod at the second connector rod section to the motor through the forward end 30 of the handle 20. Preferably, the drive rod is of a one piece construction and is of a plastic material, most preferably of a commercially available acetal copolymer. The drive rod is preferably made by injection molding. Alternatively, the drive rod may be of a metal material, or another substantially rigid material.

In some example implementations, the drive rod 54 may comprise a hollow housing 66. The housing may be arranged so that the drive rod extends through the housing. The housing may be sized and dimensioned to contain a return mechanism arrangement such as, for example, a spring 68, as shown in FIG. 3. Other return mechanisms are also contemplated. The return mechanism may be utilized to ensure a connection is achieved reliably between the brush head section 18 and the handle 20. Because it may be impossible to predict where the handle and the drive rod have last stopped, the return mechanism acts to substantially ensure that the connection features always meet. Thus the spring or return mechanism may force the brush head section towards the forward end 30 of the handle to assist with achieving this connection. The coupling member 60 is utilized to ensure that the brush head section and the handle are coupled to one another despite the linear movement and/or vibration of the drive rod.

In operation, the drive rod 54 has an axis oriented so as to extend coincident with, or substantially parallel to, the longitudinal axis 16 of the electric toothbrush 10. The drive rod is thus is arranged to linearly move along (i.e., be reciprocated along, or substantially parallel to) its axis by the motor. The motor may be operatively coupled with the drive rod such that actuation of the motor linearly and bi-directionally moves the drive rod along the axis thereof. This motion causes the first bristle support member 34, coupled to the drive rod, to be rotated in the first direction and the second bristle support member 42, coupled to the first bristle support member, to be rotated in the second direction.

In some example implementations, the drive rod 54 may be coupled to the first bristle support member 34 by a first linkage bar 56. The first linkage bar may comprise a first end 56A coupled to the drive rod at the first connector rod section. For example, and as illustrated in FIG. 3, the first connector rod section of the drive rod may define a groove 62A arranged to receive the first end of the first linkage bar therebetween. A fastener may extend through the groove and the first end of the first linkage bar so as to fixedly couple these elements together. The first linkage bar may also comprise a second end 56B eccentrically coupled to the first bristle support member so as to form a first fixed connection point. The first fixed connection point of the first linkage bar may be spaced apart from the centrally defined axis 36 of the first bristle support member.

In some further example implementations, the second bristle support member 42 may be coupled to the first bristle support member 34 by the second linkage bar 58. The second linkage bar may comprise a first end 58A coupled to the first fixed connection point formed by the eccentric coupling of the second end 56B of the first linkage bar 56 to the first bristle support member 34. A fastener may extend through the first end of the second linkage bar, the second end of the first linkage bar, and into an opening 56C defined in the first bristle support member at the first fixed connection point so as to fixedly couple the drive rod and the first bristle support member together via the first linkage bar. The second linkage bar may also comprise a second end 58B eccentrically coupled to the second bristle support member so as to form a second fixed connection point. The second fixed connection point of the second linkage bar may be spaced apart from the centrally defined axis of the second bristle support member. A fastener may extend through the second end of the second linkage bar and into an opening 58C defined in the second bristle support member at the second fixed connection point so as to fixedly couple the first bristle support member and the second bristle support member together via the second linkage bar.

Accordingly, due to the engagement of the drive rod 54 with first bristle support member 34, as described above, as the drive rod is linearly moved along its axis, the linear movement of the drive rod translates into rotational movement, via the first linkage bar 56, of the first bristle support member in the first direction and rotational movement, via the second linkage bar 58, of the second bristle support member 42 in the second direction. Specifically, the first bristle support member and the second bristle support member are arranged to rotate, in opposite directions, through a specific angle during a forward stroke of the drive rod and counter rotate coincidently with a return stroke of the drive rod. While the first bristle support member and the second bristle support member are in motion, the brush head section 18, as a unit, is relatively stationary relative to the handle 20.

In particular, for example, when in operation, the angle of rotation (from an initial position of 0°) of the first bristle support member 34 in the first direction (e.g., counterclockwise) is in the range of between about 25° to about 40°, preferably in the range of between about 28° to about 33°, and most preferably in the range of between about 29° or about 30° to about 32°. An angle of about 30° is most preferable. Likewise, the angle of rotation of the second bristle support member 42 is in the opposite, second direction (e.g., clockwise), but the same angle of rotation as the first bristle support member. For example, the angle of rotation of the second bristle support member (from an initial position of 0°) in the second direction is in the range of between about −25° to about −40°, preferably in the range of between about −28° to about −33°, and most preferably in the range of between about −29° or about −30° to about −32°. An angle of about −30° is most preferable.

Figure 6B:
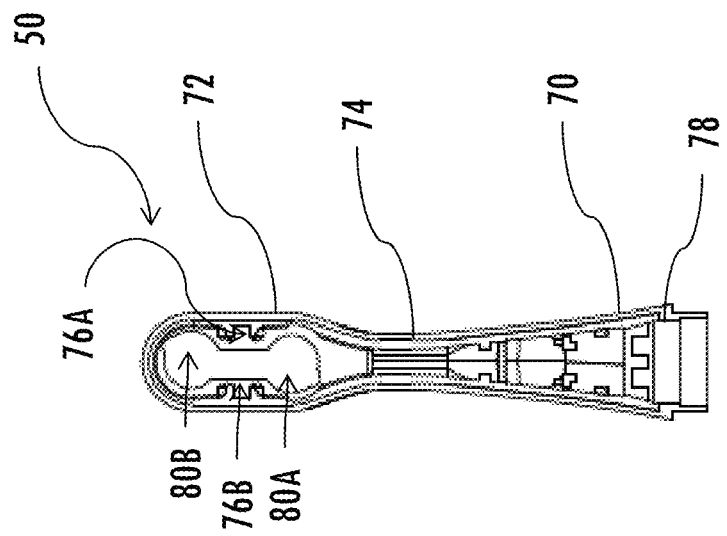
FIG. 6B illustrates a plan view of the front shell of FIG. 6A.
Figure 6A:
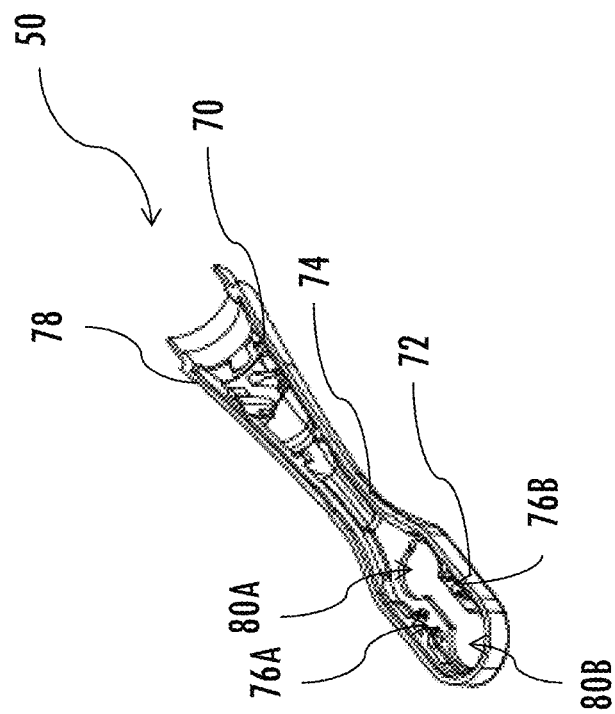
FIG. 6A illustrates a perspective view of a front shell according to various example implementations of the present disclosure.

FIG. 6A illustrates a perspective view of an example implementation of the front shell 50. FIG. 6B illustrates a plan view of the same. The front shell has a rear section 70, a forward section 72, and a connecting neck section 74 extending between the rear and forward sections of the front shell. As can be seen in FIG. 6A, the cross section of front shell as viewed along an end changes in geometry along its length from round or substantially round to trough-like to essentially planar along its longitudinal axis from its rear section to its forward section.

The rear section 70 of the front shell 50 is shaped, sized, and configured for engagement to the handle 20 at the forward end 30 thereof. The front shell defines, at the forward section 72, a pair of recesses 76A, 76B used to engage the front shell with a pair of prongs of the back shell. The rear section of the front shell has a back end 78 which, in a preferred embodiment, is essentially circular in cross section, but preferably conforms geometrically to the forward end of the handle to obtain a fitting and secured engagement. The back end narrows in cross section in a forward direction towards the forward section 72.

The pair of recesses 76A, 76B of the front shell 50 may be sized, spaced, and arranged so that openings 80A, 80B may be defined in the front shell on either side of the pair of recesses. The openings may permit the first bristle support pad 38 and the second bristle support pad 46 to extend therethrough. As such, the first bristle support member 34 is disposed adjacent a first side of the pair of recesses and the second bristle support member 42 is disposed adjacent a second side of the pair of recesses.

Figure 7B:
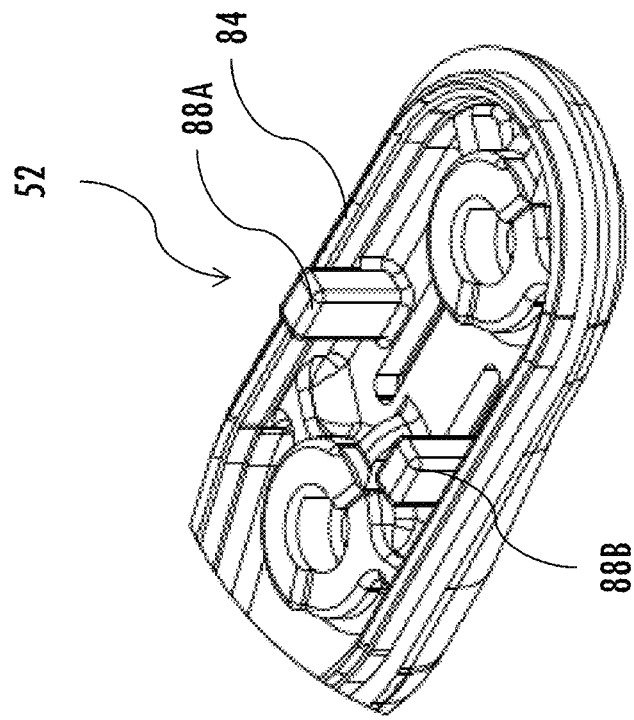
FIG. 7B illustrates a detailed view of a forward end of the back shell of FIG. 7A.
Figure 7A:
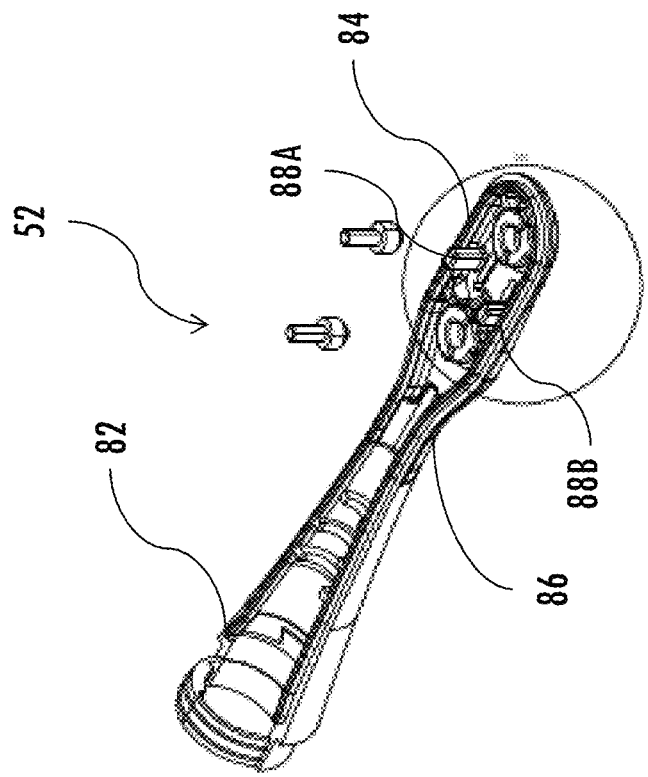
FIG. 7A illustrates a perspective view of a back shell according to various example implementations of the present disclosure.

FIG. 7A illustrates a perspective view of an example implementation of the back shell 52. FIG. 7B illustrates a detailed view of a forward end of the same. The back shell has a rearward end 82 and a forward end 84 with an intermediate section 86 therebetween. In some implementations, the back shell may be preferably fashioned so that it will have a complimentary fit with the front shell 50. In this manner, the front shell and the back shell fittingly engage one another to form an interior cavity, in which the first bristle support member 34, the second bristle support member 42, and at least a portion of the drive rod 54 are received. The forward end of the back shell may be shaped and dimensioned to conform to the contour outline of the corresponding end at the forward section 72 of the front shell.

In some example implementations, the back shell 52 comprises a pair of arms or prongs 88A, 88B that are provided in the forward end 84 and extend therefrom into the interior cavity. Each of the pair of arms or prongs may comprise a substantially planar surface and may be arranged so that when the back shell is engaged with the front shell 50, the pair of arms is aligned and engages with the corresponding recesses 76A, 76B. Such alignment may prevent the front shell and the back shell from disengaging with one another. Similarly, the coupling member 60 (in FIG. 3) may couple to the front shell and the back shell engaged with one another to prevent the front shell and the back shell from disengaging with one another, while simultaneously coupling the engaged front shell and back shell to the forward end 30 of the handle 20.

Further, FIGS. 7A and 7B illustrate a fixation point for each of the oscillation heads of the brush head section 18. More particularly, a pair of fasteners may extend through the back shell 52 and axially engage a bottom member of the first and second bristle support members 34, 42. The fasteners may fixedly couple the bristle support members to the back shell without preventing rotation of the first and second bristle support members within the interior cavity.

Figure 8:
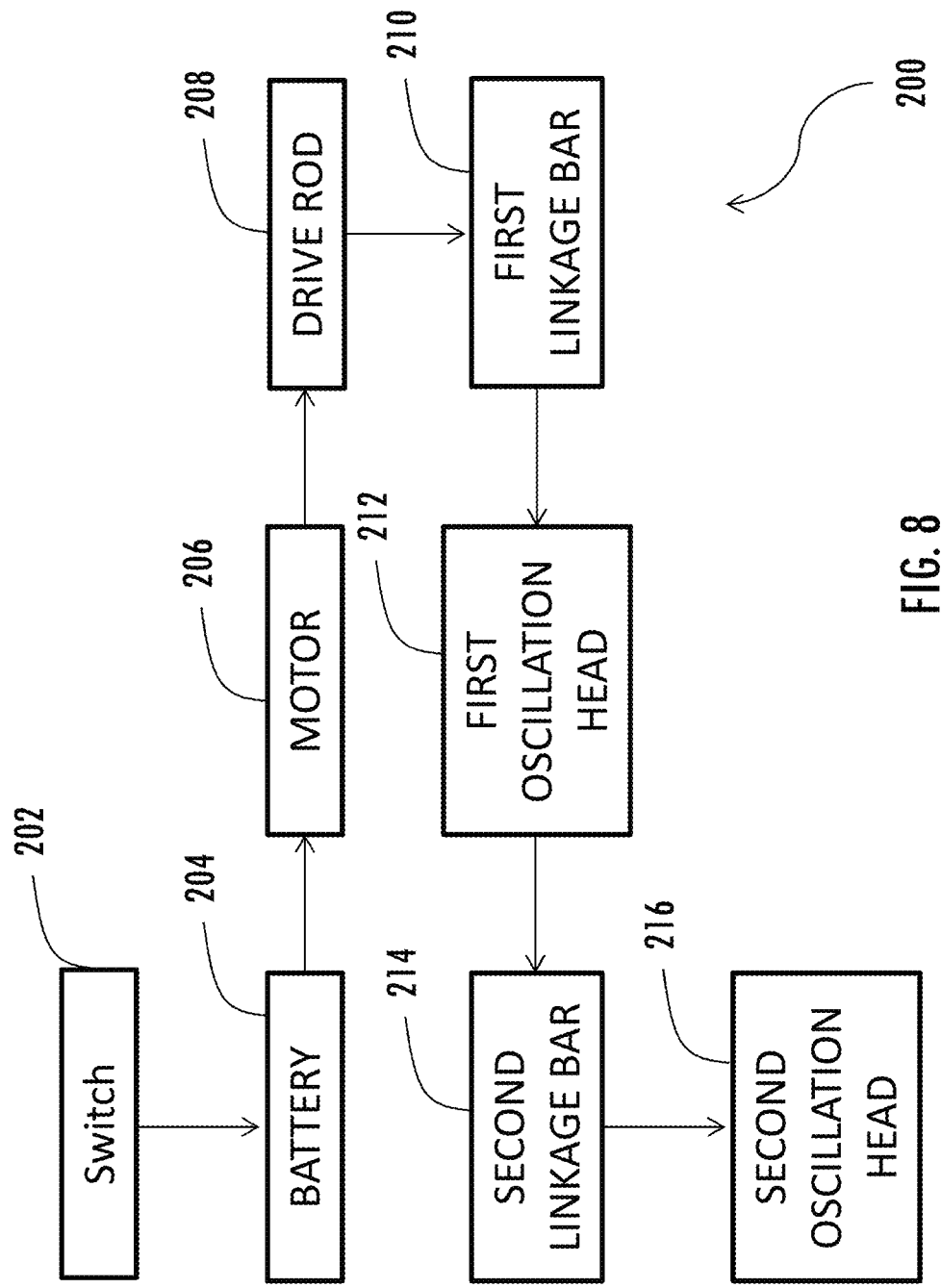
FIG. 8 illustrates a schematic of the electric toothbrush including a replaceable brush head according to example implementations of the present disclosure.

Now referring to FIG. 8, a schematic of an electric toothbrush 200 including a replaceable brush head is illustrated. The electric toothbrush illustrated in FIG. 8 may be the same or substantially similar to the electric toothbrush 10 illustrated in, for example, FIG. 1.

The electric toothbrush 200 may include an activation/deactivation switch 202 that may be electrically connected (e.g., via a circuit board) to a power source 204, such as a battery.

Interaction with the activation/deactivation switch may result in either activating (actuating) electrical current to flow from the power source to a motor 206, or deactivating (ceasing) the flow of electrical current from the power source to the motor. The power source may be a rechargeable battery that is rechargeable via a standard wall outlet, or the power source may be a replaceable battery. The motor may be a DC motor (e.g., a DC brush motor, a DC planetary gear motor, a DC vibration motor, and the like), which may rotate a gear built into a top of the motor. A cam and gear unit may be connected between the gear built on top of the motor and a drive rod 208, so as to convert high-speed rotary motion of the motor into reciprocating (back and forth motion) of the drive rod along its axis.

The drive rod 208 may be coupled to a first linkage bar 210 at a first end of the first linkage bar. An opposing second end of the first linkage bar may be eccentrically coupled to a first oscillation head 212. The reciprocating motion of the drive rod may translate into rotational movement of the first oscillation head in a first direction about a centrally defined axis thereof. The first oscillation head may be coupled to a second linkage bar 214, which is eccentrically coupled about its first end to the first oscillation head. The second linkage bar may be eccentrically coupled about an opposing second end to a second oscillation head 216. The rotation of the first oscillation head in the first direction may translate to rotation of the second oscillation head in a second direction about a centrally defined axis thereof. The second direction may be opposite the first direction, such that the first oscillation head rotates counterclockwise and the second oscillation head rotates clockwise.

Accordingly, the electric toothbrush and the replaceable brush head disclosed herein resolve issues that may be present in current electric toothbrushes and/or replaceable brush heads due to the drive rod disclosed herein being indirectly and fixedly coupled with the first oscillation head and the second oscillation head so that friction is substantially reduced, and, thus, vibration to the user is substantially reduced. In this manner, the replaceable brush head and the drive system of the electric toothbrush do not receive as much wear as electric toothbrushes utilizing a drive system of point to point or rolling contact (see, e.g., US Patent Publication No. 2016/0199165 to Nikitczuk incorporated by reference herein), which have higher degrees of friction. Therefore, the electric toothbrush and the replaceable brush head disclosed herein provide a solution to the problem of creating cost effective and ergonomic electric toothbrushes.

Further, the electric toothbrush and replaceable brush head disclosed herein resolve issues that may be present in electric toothbrushes having a single bristle head. The multi-directional cleaning that results from the two bristle heads disclosed herein moving in opposite directions results in a cleaning experience that is twice as effective as the cleaning experience with a single, oscillating bristle head. Specifically, the opposing sweeping arcs of the two bristle heads, disclosed herein, enable the electric toothbrush and replaceable brush head disclosed herein to clean hard to reach areas more effectively.

Many modifications and other embodiments of the disclosure set forth herein will come to mind to one skilled in the art to which these disclosure pertain having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An electric toothbrush comprising:
 an elongated body portion with opposed first and second ends and a longitudinal axis extending between the first and second ends;
 a brush head section arrangeable toward the first end of the elongated body portion and comprising:
  a first bristle support member rotatable in a first direction about a centrally defined axis of the first bristle support member, and
  a second bristle support member coupled to the first bristle support member and rotatable in a second direction about a centrally defined axis of the second bristle support member, the second direction being opposite the first direction; and
 a drive rod coupled to at least the first bristle support member and having an axis oriented so as to extend coincident with, or substantially parallel to, the longitudinal axis of the electric toothbrush, the drive rod being arranged to linearly move along the axis so as to rotate the first bristle support member in the first direction and rotate the second bristle support member in the second direction;
 wherein the drive rod is coupled to the first bristle support member by a first linkage bar, the first linkage bar comprising a first end coupled to the drive rod and a second end eccentrically coupled to the first bristle support member so as to form a first fixed connection point, the first fixed connection point of the first linkage bar being spaced apart from the centrally defined axis of the first bristle support member, and wherein the second bristle support member is coupled to the first bristle support member by a second linkage bar, the second linkage bar comprising a first end coupled to the first fixed connection point and a second end eccentrically coupled to the second bristle support member so as to form a second fixed connection point, the second fixed connection point of the second linkage bar being spaced apart from the centrally defined axis of the second bristle support member.

2. The electric toothbrush of claim 1, wherein the second end of the elongated body portion comprises a handle having a motor contained therein, the handle being engageable with the brush head section.

3. The electric toothbrush of claim 2, wherein the motor is operatively coupled with the drive rod such that actuation of the motor linearly and bi-directionally moves the drive rod along the axis thereof.

4. The electric toothbrush of claim 2, further comprising a battery within the handle to power the motor.

5. The electric toothbrush of claim 1, wherein the brush head section comprises a front shell and a back shell fittingly engaged with one another to form an interior cavity, the first bristle support member, the second bristle support member, and at least a portion of the drive rod being received within the interior cavity.

6. The electric toothbrush of claim 5, wherein the first bristle support member and the second bristle support member extend through the front shell.

7. The electric toothbrush of claim 1, wherein the brush head section comprises a first bristle support pad having one or more bristle tufts arranged thereon and coupled to the first bristle support member and a second bristle support pad having one or more bristle tufts arranged thereon and coupled to the second bristle support member, the first bristle support pad being rotatable in the first direction and the second bristle support pad being rotatable in the second direction.

8. A brush head for an electric toothbrush having an elongated body portion with opposed first and second ends and a longitudinal axis extending between the first and second ends, the brush head comprising:
 a brush head section arrangeable toward the first end of the electric toothbrush and comprising:
  a first bristle support member rotatable in a first direction about a centrally defined axis of the first bristle support member, and
  a second bristle support member coupled to the first bristle support member and rotatable in a second direction about a centrally defined axis of the second bristle support member, the second direction being opposite the first direction; and
 at least a portion of a drive rod coupled to at least the first bristle support member and having an axis oriented so as to extend coincident with, or substantially parallel to, the longitudinal axis of the electric toothbrush, the portion of the drive rod being arranged to linearly move along the axis so as to rotate the first bristle support member in the first direction and rotate the second bristle support member in the second direction;

wherein the drive rod is coupled to the first bristle support member by a first linkage bar, the first linkage bar comprising a first end coupled to the drive rod and a second end eccentrically coupled to the first bristle support member so as to form a first fixed connection point, the first fixed connection point of the first linkage bar being spaced apart from the centrally defined axis of the first bristle support member, and wherein the second bristle support member is coupled to the first bristle support member by a second linkage bar, the second linkage bar comprising a first end coupled to the first fixed connection point and a second end eccentrically coupled to the second bristle support member so as to form a second fixed connection point, the second fixed connection point of the second linkage bar being spaced apart from the centrally defined axis of the second bristle support member.

9. The brush head of claim 8, wherein the brush head section is engageable with a handle arranged at the second end of the elongated body portion of the electric toothbrush and having a motor contained therein.

10. The brush head of claim 9, wherein at least the portion of the drive rod is operatively coupled with the motor such that actuation of the motor linearly and bi-directionally moves at least the portion of the drive rod along the axis thereof.

11. The brush head of claim 8, wherein the brush head section comprises a front shell and a back shell fittingly engaged with one another to form an interior cavity, the first bristle support member, the second bristle support member, and at least the portion of the drive rod being received within the interior cavity.

12. The brush head of claim 11, wherein the first bristle support member and the second bristle support member extend through the front shell.

13. The brush head of claim 8, wherein the brush head section comprises a first bristle support pad having one or more bristle tufts arranged thereon and coupled to the first bristle support member and a second bristle support pad having one or more bristle tufts arranged thereon and coupled to the second bristle support member, the first bristle support pad being rotatable in the first direction and the second bristle support pad being rotatable in the second direction.

* * * * *